US012095505B2

(12) United States Patent
Cromarty et al.

(10) Patent No.: US 12,095,505 B2
(45) Date of Patent: Sep. 17, 2024

(54) INTERNET-OF-THINGS METHODS AND SYSTEMS

(71) Applicant: Heathkit Company, Inc., New York, NY (US)

(72) Inventors: Andrew S. Cromarty, Santa Cruz, CA (US); Donald J. Peterson, Santa Cruz, CA (US); Jasen Levoy, Santa Cruz, CA (US); William Charles Calhoun, Santa Cruz, CA (US)

(73) Assignee: Heathkit Company, Inc., Ottsville, PA (US)

( * ) Notice: Subject to any disclaimer, the term of this patent is extended or adjusted under 35 U.S.C. 154(b) by 0 days.

(21) Appl. No.: 15/654,856

(22) Filed: Jul. 20, 2017

(65) Prior Publication Data
US 2021/0314064 A1   Oct. 7, 2021

Related U.S. Application Data

(60) Provisional application No. 62/364,900, filed on Jul. 21, 2016, provisional application No. 62/364,649, filed on Jul. 20, 2016.

(51) Int. Cl.
*H04B 10/114* (2013.01)
*H04W 84/18* (2009.01)

(52) U.S. Cl.
CPC ........ *H04B 10/1149* (2013.01); *H04W 84/18* (2013.01)

(58) Field of Classification Search
CPC ..................... H04B 10/1109; H04W 84/18
See application file for complete search history.

(56) References Cited

U.S. PATENT DOCUMENTS

| | | | |
|---|---|---|---|
| 8,346,097 B1* | 1/2013 | Benzoni | H04B 10/564 398/198 |
| 8,417,503 B2* | 4/2013 | Bernstein | G06F 30/33 716/132 |
| 2006/0149530 A1* | 7/2006 | Hemmert | H03H 7/12 704/200 |
| 2011/0163900 A1* | 7/2011 | Pagnanelli | H03M 3/468 341/166 |
| 2014/0303812 A1* | 10/2014 | Avritch | B64C 13/505 701/3 |
| 2015/0102956 A1* | 4/2015 | Miles | G01S 17/66 342/73 |
| 2016/0183009 A1* | 6/2016 | Kim | H04R 25/30 381/315 |
| 2016/0335865 A1* | 11/2016 | Sayavong | G06F 16/951 |
| 2017/0013384 A1* | 1/2017 | Seymour | H04S 1/00 |
| 2017/0307679 A1* | 10/2017 | Turner | G01R 31/287 |

* cited by examiner

*Primary Examiner* — Walter J Divito
(74) *Attorney, Agent, or Firm* — SQUIRE PATTON BOGGS (US) LLP (57) ABSTRACT

Disclosed herein are methods and systems for appliances, including networked or "Internet-of-Things" appliances.

30 Claims, 4 Drawing Sheets

Fig. 1. Exemplary appliance with manufacturing variation of at least one performance variable Frequency distribution of effector component resonant frequencies as manufactured Stimulus signal range to effector component spanning selected range of manufacturing variation (via FM modulation)

Fig. 2. Flowchart for determining and configuring system adaptable for manufacturing variation of at least one performance variable Fig. 3. Exemplary loudspeaker effector appliance with inter-appliance association, communications and control enabled by NFC "tap"

Fig. 4. Exemplary Digilog Display effector appliance embodiment using LEDs, light pipes, and diffusion bezel

INTERNET-OF-THINGS METHODS AND SYSTEMS

PRIORITY

This application is a non-provisional utility application of U.S. Pat. App. No. 62/364,900, filed Jul. 21, 2016 and U.S. Pat. App. No. U.S. Pat. App. No. 62/364,649, filed Jul. 20, 2016, both of which are hereby incorporated by reference in their entireties for all that they teach.

FIELD OF INVENTION

Disclosed herein are methods and systems for appliances, including networked or "Internet-of-Things" appliances. Appliances are apparatus that typically comprise electrical or electronic components essential to their function. Appliances are designed to perform or provide one or more specific useful operations or services to their users or owners. Although an appliance may perform more than one function, typically an appliance is designed to have a primary function or provide a principal service. For example, a consumer electric clock is an appliance that employs electricity, and typically today comprises electronics, to continuously display the current local time, and often also to provide a settable alarm function. An electric coffee-maker makes coffee. An electric coffee-making machine may further incorporate an electric clock, to provide for starting its operation without the instant intervention by or presence of its owner. A clock-radio is a composite appliance that combines a clock appliance or alarm clock appliance with a radio receiver appliance. A building thermostat is an appliance that settably controls ambient temperature in a building by sending a simple on or off electrical signal to a furnace heating system and/or air conditioner cooling system. Many other appliances are commonly known, such as metronomes, all forms of radios and televisions, personal computers and peripherals, kitchen and laundry equipment, electric lock systems, lighting system components, building alarm system and security sensors and effectors, garage door openers and garage/storage space sensors, irrigation system components, meteorological sensor and reporting components, game consoles and their sensors/effectors, audiovisual projectors, microphones and loudspeakers and other acoustic reproduction components, electrical vacuum cleaners and sweepers and other cleaning components, electrical controls for gas fireplaces, electrical toys, electrically driven or remote-control vehicles/aircraft/vessels whether on air/land/sea, photography apparatus, and display components associated with all the above. This list of appliances is exemplary and does not limit the scope of appliances, but rather shows that it is simultaneously broad but well-defined. For example a passive and non-electrical component such as a hammer or pencil is a device, but it is not an appliance.

BACKGROUND

The purpose of electricity in an appliance generally is twofold, namely the provision of an energy source for animation of the appliance's operation and as a medium for expressing its information-theoretic content and activity. Thus in the future it is anticipated that appliances may use non-electrical power as well as electric power. For example, a nuclear-powered, geothermal-powered, solar-powered, water-powered, thermal-powered, gravity-powered, or wind-powered appliance all can be expected to emerge and when they do will fall within the scope of "appliance" whether or not their power is derived from an expressly electrical source. Similarly a non-electrical optical or quantum computing platform would still meet this use of appliance by virtue of non-passively providing one or more specific useful operations or services and comprising information-theoretic content required for their operation but generally lacking in a device such as a hammer sitting on a shelf.

An important distinguishing feature of appliances is that their utility can be improved by enabling communication and computation, in part by virtue of their electrical nature and in part by virtue of their role in our lives and the way we use them. For example, trivial examples of adding a client-server interface to a television, thermostat, refrigerator, or coffee-maker are known today. Generally these trivial interfaces comprise providing remote access to the local controls of the device or its internal data that normally would be limited to its local display, such as through a hand-held infrared or other wireless remote control device or an electrical connection to a web browser (accomplished by presenting the remote interface as a web page or concealing its underlying web-page implementation through the visual artifice of a mobile phone "app"). Simple commands or data may be transferred to and from such appliances using these trivial interfaces, but computations themselves are not transferred to, from, or among them, only data that may support some other computation not transferred by the interface. In this disclosure, an exemplary appliance such as an electrical or electronic clock is sometimes used for simplifying disclosure particularly of embodiments, but this is to be understood to be informative and not limiting, and all appliances are intended to be understood as disclosed through such exemplary references.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Figure 1:
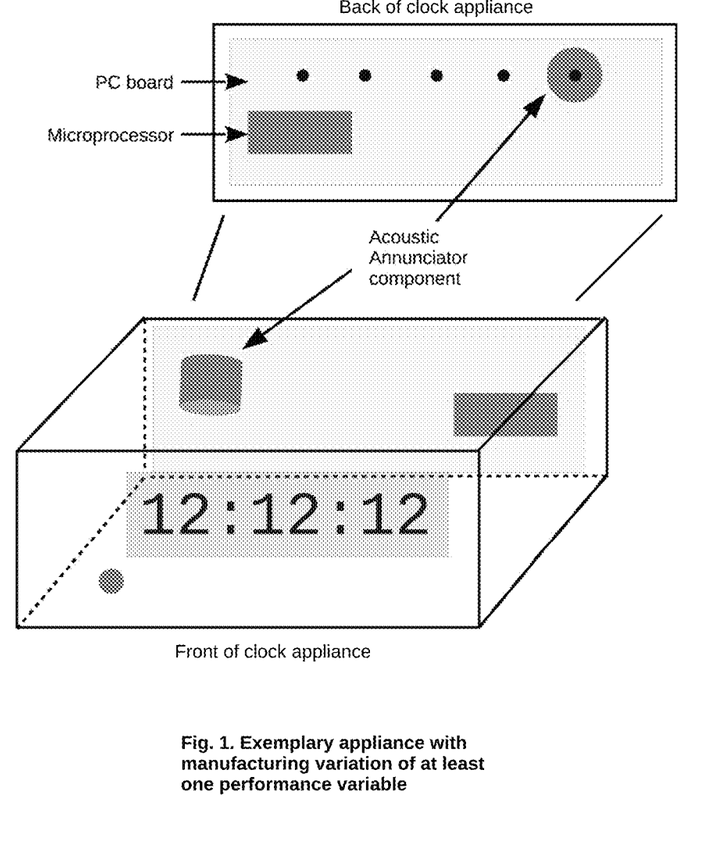
FIG. 1 shows the basic architecture of the invention.
Figure 2:
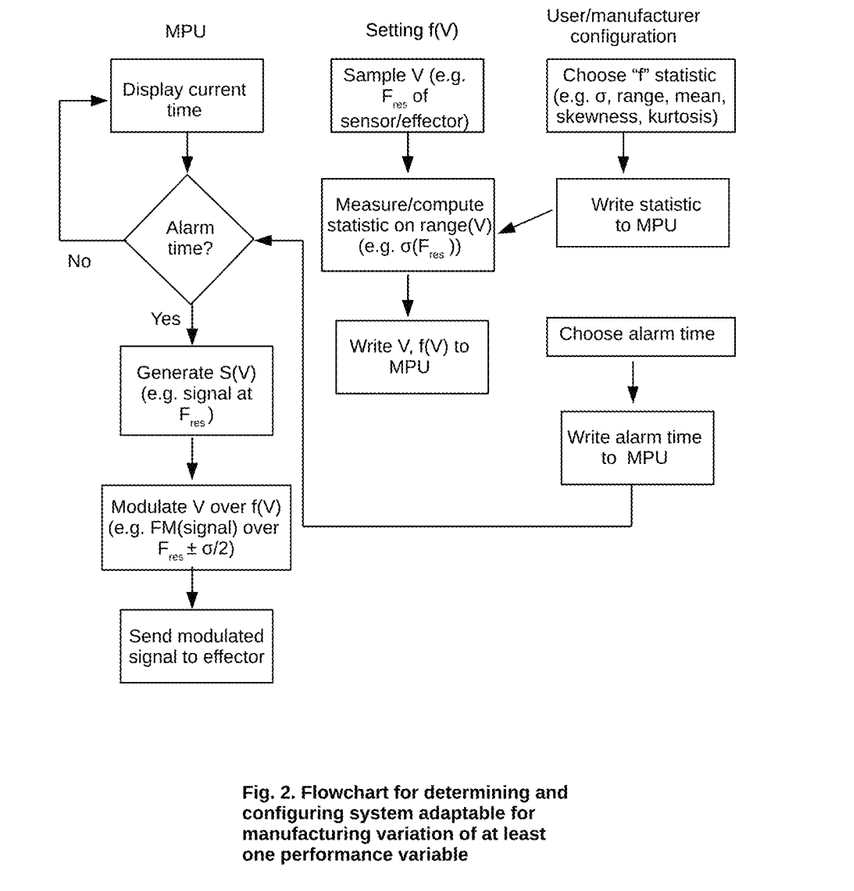
FIG. 2 shows the flowchart for determining and configuring system
Figure 3:
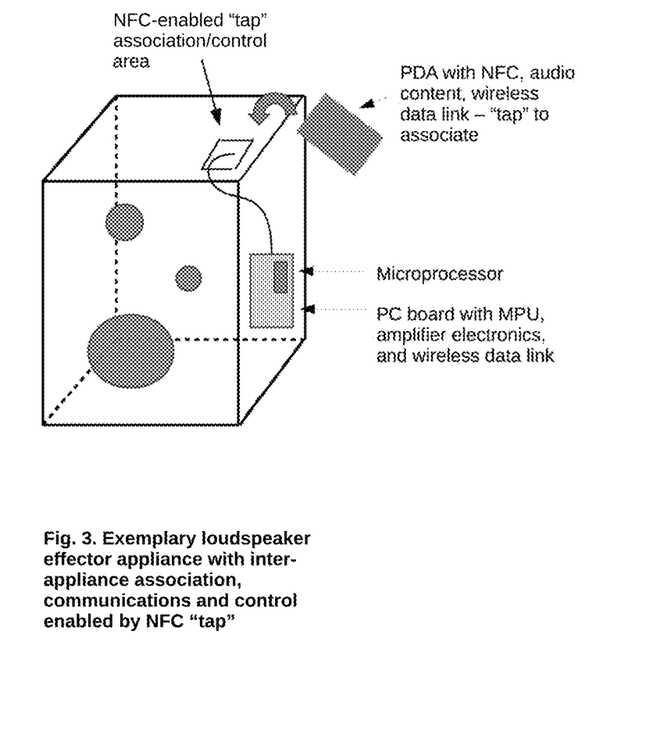
FIG. 3 shows an exemplary loudspeaker effector appliance
Figure 4:
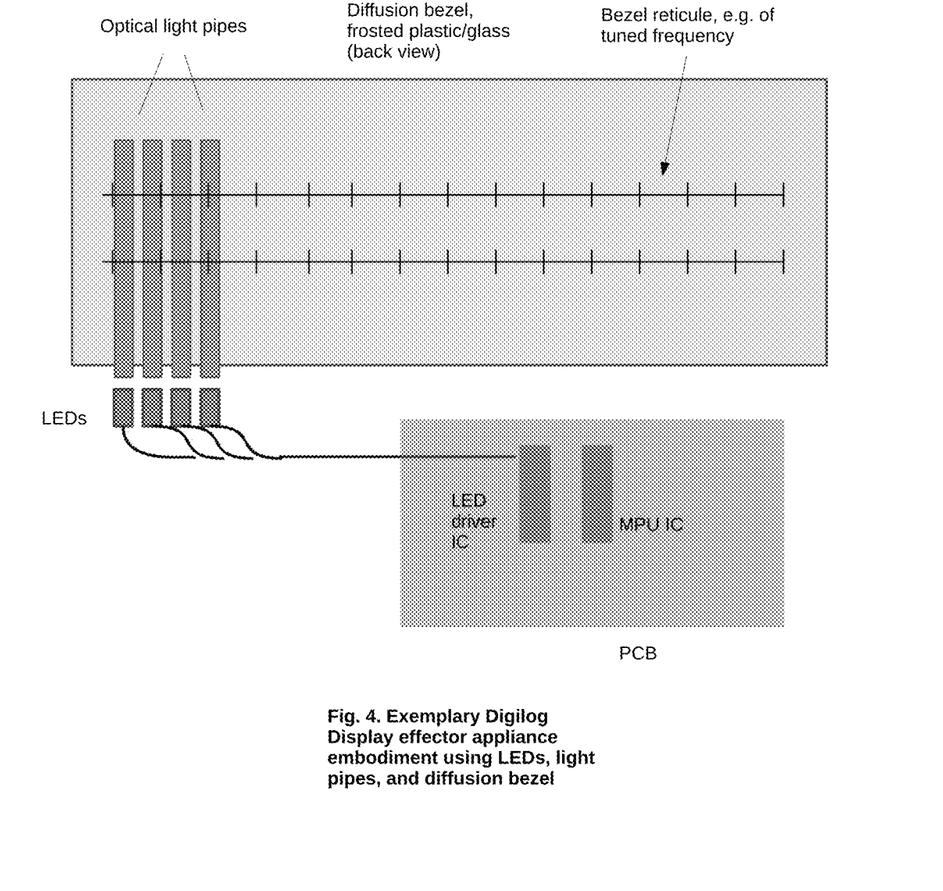
FIG. 4 shows an exemplary digilog display effector appliance

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The term "Internet-of-Things" (IoT) has been in use for many years to refer to adding an Internet-capable network connection of any form to devices, including appliances. Preparation for world-wide Internet-based connection of devices was begun and enabled decades ago through, inter alia, the conscious redesign of the TCP/IP networking protocol suite (in an adaptation known as "IPv6") to accommodate quadrillions of individually-identifiable networked hardware objects and provide for security of data transiting Internet-connection links (for example, using "IP Security" or "IPSEC" encryption and related known methods and systems).

Adapting Electronic Appliances for Design or Manufacturing Variation:

Problem: It is not always known or knowable what the resonant frequency, voltage-dependent, current-dependent, impedance, or frequency-dependent performance profile of an electronic, acoustic, electroacoustic, loudspeaker, piezoelectric, or other appliance effector component is. For example, the resonant frequency and frequency-dependent sound pressure level of an electronic acoustic annunciator may vary from product instance to product instance due to manufacturing variations. For technical or business reasons it may be infeasible to measure each component instance to determine its performance profile. As one example without limitation, when designing a product such as an alarm clock using an electroacoustic annunciator component as an wake-up alarm, sending any single designated frequency to the acoustic annunciator can result in different volume levels in different product instances, making some product instances less effective than others for their intended purpose due principally to uncontrollable, unmeasured, or unmeasurable component variations.

Solution: In this invention we send a varying control or stimulus signal to the component having an expected-varying performance profile. In one embodiment, we frequency modulate an audio-frequency electrical signal provided to the acoustic annunciator. In a preferred embodiment, the control or stimulus variable or variables provided to the component are selected to span the expected, measured, or design range of variation of the component. For example, the signal provided to an audio annunciator may be frequency-modulated through a frequency range selected to span frequencies from above to below the known or expected resonant frequency of the annunciator. The mean value theorem guarantees that the actual resonant frequency of the annunciator will be crossed when ranging from above to below it, or vice versa, thus providing it its optimal input. This method and system provides the benefit that the annunciator will receive a control or stimulus input at its best (resonant) frequency, and thus produce its maximum possible alarm or alerting volume despite variations in component manufacturing, creating a uniform experience across all product instances despite component variations, and improving the alerting and attentional effect of the alarm. This example embodiment will be understood not to be limiting, and all manufactured devices having a performance profile specified or observed to have a range rather than a unique point value, whether by design or due to manufacturing variations, can be optimized in their performance using this method and system.

Power Failure Resilience:

Problem: Clocks are expected to run for long periods of time reliably and dependably, usually many years without a single failure. It is not uncommon in most locales worldwide to experience one or more mains power failures at least once during such a long period of time. Clocks are known that rely on the power mains both to provide power to the clock circuitry and to maintain tight timekeeping tolerances, by synchronizing the clock to the regional line frequency of 50 HZ (e.g. in Europe) or 60 Hz (e.g. in North America), which is known to be very constant averaged over a long time period. Thus when power mains fail, clocks correspondingly experience failures including stopping time display due to lack of mains power, losing their time, and losing their synchronization. It is possible for a clock to provide battery backup similar to that commonly used in low-power-consumption smoke and fire detectors, such as by using a low capacity 9V 550 mAh battery. However, many clocks and other appliances have display and other components presenting a much higher current requirement demand for operation than low-power devices, such that multiple batteries would be required to sustain the appliance's operation during a prolonged mains power failure, and it is known to be bad design and potentially dangerous to configure multiple 9V batteries electrically in parallel to extend the appliance's duration of operation in the absence of mains power. Thus although battery backup in mains-powered clocks and other appliances may accommodate very short outages, that method and system fails in many appliances with higher current demands and/or where use calls for greater reliability, such as use in remote locations where power is not quickly restored to the clock or other appliance. Further, the higher quality and more energy-consuming the clock display or alarm are, the more quickly they drain the internal battery when the mains power fails, thus imposing on consumers the choice of poor appliance quality or poor reliability. Consumers appreciate a high-visibility high-quality clock display but this can be the largest power consuming component in a clock. Also, commercial clocks commonly are known to resume display by restarting their time at midnight when power is restored, whether proceeding from there or remaining at midnight. Indeed it is a quarter-century-long joke that video cassette recorder (VCR) clocks blink 12:00 forever in most western homes. This means the clock is very carefully keeping exactly the wrong time when it restarts.

Solutions: In one embodiment, the clock may be fitted with a larger battery comprising more cells to create a longer operating life during mains failures. Such cells are beneficially arranged electrically in series in order to avoid risks of unbalanced charge in parallel cells while providing a suitably high battery charge capacity to achieve longest possible reliability. For example, D, C, AA or AAA cells may be arranged in series to achieve high capacity at a suitable voltage. In another embodiment, these cells may be rechargeable cells and the clock may be equipped with an internal or outboard charging circuit to keep the rechargeable cells charged, thereby extending the reliable time of the clock time. In another embodiment, the clock or other appliance may be provided, adapted, or configured to accept power from a larger capacity battery power supply that is either additional to or operates instead of the primary internal batteries of the clock or other appliance. In a preferred embodiment, the internal battery supply is rechargeable, the external battery supply is rechargeable, and the clock or appliance senses its power supply to determine whether the power mains are operative and changes to a lower-power consumption profile in the absence of mains power. In one embodiment, when mains power fails the clock may have its display blanked to show no digits and consume no power for a period of time, such as several seconds, and then keep time and briefly display the current time for a short period, such as for one second. The lifespan of the batteries and the clock's functioning then are extended by a multiple determined by the duty cycle of displayed time, increasing the period of time over which the clock's kept time may be relied upon by a large multiple. The duty cycle may be beneficially computed to determine the tradeoff between consumer utility in using the appliance in its power-saving mode and the lifespan and thus reliability of the clock or other appliance. In alternative embodiments, the clock or other appliance either may be provided with a carefully computed optimal value as to this tradeoff, or may provide the user with an interface suitable to permit the user to choose this tradeoff. Such flashing of the current time on the display also alerts the owner of the current power mains failure, and informs the user that the clock remains alive and is functioning despite the mains failure. The clock continues to keep the proper time. This may be achieved by managing the clock display duty cycle using a microprocessor within the clock or other appliance specifically programmed to sense or measure the presence and reliability of the mains power and to compute or store the duty cycle ratio and send timing signals to a display controller integrated circuit to direct it to turn the time display on and off at the interval chosen to achieve the desired efficiency of battery life and display legibility. Because the clock has continued to maintain time, when the power mains returns to proper service, the clock can return to normal function and display modes without requiring user intervention.

In a third embodiment, the display brightness may be automatically adapted to the ambient light level in the clock's operating environment. Reducing the display brightness extends the life of the clock in the power mains failure operating mode and also adapts the visual appearance of the clock to the requirements of the user, making it suitably visible when ambient light is bright such as during daytime or in a brightly lit room but keeping it suitably dimmer in a dark room to prevent distraction and also reduce electrical current demands when possible.

Problem: When the power mains fail, the regional 50 Hz or 60 Hz signal that clocks use to discipline their timekeeping fails. Thus even if the clock is battery-equipped, it may drift over time and become increasingly inaccurate. In the event the error is cumulative, the longer the power mains are unavailable, the worse the clock's time estimate becomes. When power is eventually restored to such a clock, even if it can resynchronize to the regional mains frequency it will do so with an incorrect time, necessitating a clock time reset by the user through manual intervention. Solution: In one embodiment, the processor speed of the microprocessor may be calibrated according to the mains power line frequency. Adjusting the microprocessor speed to be closer to correct true time and storing this adjustment into the microprocessor such as in its oscillator calibration byte permits the frequency of the microprocessor to be calibrated to the accuracy of the line frequency. Then if a mains power failure occurs, the microprocessor has been optimized to maintain the most reliable possible internal time using its own internal oscillator-based system clock, and its resulting timekeeping functions are as accurate as they can be, thus ensuring that the timekeeping remains accurate in the absence of the line discipline provided by the power mains across power failures and clock time is not gained or lost.

Problem: When the power mains fail, if a clock is designed to maintain time internally but not display the time until power returns, the clock's display function is unavailable until mains power is restored.

Solution: The clock may be equipped with a user input interface that permits the user to request or command display of the clock's internal time while mains power has failed. In one embodiment, the clock may be equipped with a button that when pressed causes the current time to be displayed even while mains power is unavailable. This may be provided by specifically programming the microprocessor to sense the button press, determine the length of time the button is depressed, and during that time period to instruct the display electronics to send current to the display to cause the clock's internally stored or computed time to be visible to the user. In another embodiment, the display may be remotely controlled without human intervention to cause the microprocessor to suitably display the current time during a power failure, such as through a network connection to the clock microprocessor from a remote network-connected, wired, or wireless-connected controller, personal computer, smartphone, PDA, or equivalents.

Control and Computation Include Transmission and Distributed Use of Computable Objects and Data:

In one embodiment, an Atmel microprocessor programmed in the C programming language and electronically attached to its power supply and display electronics such as through the clock or other appliance's printed circuit board may be used as a suitable controller to provide of any or all of the disclosed features. In a preferred embodiment, the digital-to-analog (DAC) and analog-to-digital (ADC) conversation features of such a microprocessor are beneficially used to sense power supply characteristics and communications electronics and to control the communications electronics, and display and other effectors of the clock or other appliance. Use of an integrated embedded microprocessor specially programmed in this way comprising DAC and/or ADC interfaces between the microprocessor's digital computations and the "analog world" beneficially simplifies and reduces the component count and bill-of-materials or cost-of-goods-sold cost of the product, permits subsequent feature upgrades of the clock or other appliance, and assists in maintaining control over proprietary software loaded into or executed by the microprocessor.

In one embodiment, multiple microprocessors are provided within the clock or other appliance, with the communications, control, data management, state management, storage management, and control functions allocated to the plurality of microprocessors. Functions in computing are known to correspond to units of software, such as without limitation programs, "applications," computable effective procedures, closures, subroutines, libraries, co-routines, lambda functions, and first-class objects. In one embodiment, the allocation of functions to microprocessors is configured statically into the product as a step performed during design and manufacture of the clock or other appliance, with each such function assigned to and executing within only one microprocessor. In another preferred embodiment, functions are fungible, the allocation of functions to computers is labile or flexible, the design embodies distributed processing computing, and functions or other compatible objects may be moved, migrated, relocated, stored, computed upon, and/or executed on a plurality of computers, which may include larger computers as well as microprocessors and any combination of special-purpose microprocessors and general-purpose purpose computers wherein the general-purpose computers have been specifically programmed with distributed processing software or firmware to permit the functions associated with the appliance to perform their intended computations. In a preferred embodiment, the computer processors executing this collection of functions and computing over this collection of objects are beneficially not contained within a single physical enclosure, and may for example be moved among and between computers within and outside the clock or other appliance using wired or wireless or optical networks or connections, a computer bus, a serial or parallel connection between the computers, or other communications media, and any plural combination thereof. It will be understood that said computers may be directly or indirectly connected in any combination and according to any connectivity architecture. In a preferred embodiment, the communicated computational objects are first-class computable objects representing all forms of data including individual singleton values such as integers, bits, or bytes, composite objects such as arrays, record structures, hash tables, and procedures, and effective computable objects such as closures, virtual machines, and first-class continuations that embody a partial or complete independent computational state. In a preferred embodiment, the computational objects are encrypted and transmissions of the objects is secure. In a preferred embodiment, at least one of the microprocessors contains software recorded into its internal memory as firmware together with associated data that comprises a system and method of encryption procedure, policy and data. In one exemplary preferred embodiment, each computable object is a first-class object, each such object is embodied according to a common virtual machine model, each such object is encoded during transmission according to a standard transmission protocol and format shared by and standard across the heterogeneous connected computers, a system-wide or globally unique identifier (GUID) is assigned to each computable object, an encryption key of either the form of a pre-shared symmetric key or a public-key cryptographic system is within at least one computer processor and is applied to encrypt and decrypt the objects for transmission, each computer comprises a byte-code virtual machine wherein the virtual machine may be comprised of software written in a language such as C and loaded into or stored on one or a plurality of such processors, the virtual machine is designed at a computational abstraction level more abstract than a conventional electronic hardware processor and its microcode and above the level of the underlying operating system of a conventionally-programmed computer, but below the level of a conventional programming language user environment, the virtual machine comprises an archival format for all object types, the archival format is preferably secure such as encrypted, a shortened form of the GUI is employed within the processor during periods of computation, and at least one computer provides a persistent object storage and archival database for the computational objects. In one embodiment, any object being prepared by a first processor for transmission to a second computer processor not sharing memory with the first processor associates with the object its continuation environment sufficient for computations on the object to proceed with integrity on the second computer. In a preferred embodiment, the virtual machine comprises a properly tail-recursive byte-code interpreter providing first-class continuations. In a preferred embodiment, one or a plurality of processors are implemented as fixed or removable components such as hot-swap or rack-mountable components that are adapted to plug into a bus or backplane to permit advantageous benefits such as hot-swap capability, fault tolerant computing, distributed processing, high availability, disaster recovery, workload sharing, load balancing, migration of computing to computing nodes having unusual or unique sensors or effectors or capabilities, or any combination thereof. In a preferred embodiment, a collection of metrics is maintained and updated to quantify the costs and benefits of migration vs. local computation for each computational step in any local or distributed computation in order to permit a software controller to determine dynamically when and whether to migrate a computation for any period of time or number of steps to the best available processor based on the metrics, which determination takes into account the nonuniform resources available among the heterogeneous nodes as well as simple load balance. In one embodiment, the fault-tolerance or object migration determination is computed based on a predictive model of failure of the source node of a migration computation. In one embodiment, object migration determination is decided computationally using operations research mathematical optimization techniques manifest as an algorithm implemented in software executing on at least one of the processors. In another embodiment, such determination is made using machine symbolic reasoning techniques comprising backward chaining, forward chaining, metalevel reasoning, or a combination thereof. In one embodiment, a graph-structured representation of the knowledge comprising the metrics is expressed declaratively in data structures within the processors or in their associated storage. In a preferred embodiment, the graph-structured declarative knowledge comprises metaknowledge annotations providing the abstract or human-understandable reason for the knowledge and the annotations are accessible to the symbolic reasoning system in association with the knowledge such as may support explanation to humans or to other apparatus for the determinations reached by the processor executing its software. In a preferred embodiment, the continuation environment is created by walking the heap and stack space of the first processor to identify and copy or move all the associated objects required for that continuation environment and assembled as a closure, continuation, or executable procedure that may be executed by the virtual machine at the second processor. In a preferred embodiment, the preferably secure archival and transmission format may be employed to inject a continuation, closure, singleton, data structure, procedure, stored knowledge, or any other computational object into an existing or new namespace of another, target processor and its virtual machine environment whether or not it already comprises computational objects with the beneficial effect of augmenting or replacing the target computing environment, migrating the object or objects away from or toward a location based on algorithmic or symbolic reasoning resource determination, or a combination thereof.

Appliance Association and Control:

The larger number of anticipated IoT devices creates an identification and association problem. In this invention it is possible to identify appliances and other IoT apparatus using systemwide, regional, application-specific, or globally-unique identifiers (GUIDs) such as, without limitation, at least one assigned or apparatus-obtained IPv6 address, a physical apparatus address (such as a MAC or IMEI address), an user- or owner- or manufacturer-assigned value, sufficiently precise geolocation data whether measured or self-reported by the apparatus, or any combination thereof. Appliances, sensors, and effectors may obtain an IP address at time of manufacture, during field installation, during a configuration or customization or localization procedure, or dynamically and even continuously/repetitively such as through known protocols including DHCP. Location measurement may include, without limitation, mensuration data, triangulation, partly- or entirely automated visual location such as through a camera-based sensing system, inertial navigation data reporting, and computation thereon either in relative or absolute coordinates and with or without combination of known other geolocation data, nearby apparatus reporting or distance inference. For example, in a system wherein identity comprises location, a newly placed apparatus can determine its location and thus identity by reverse triangulation using active or passive sensing and active or passive communications with, that is, requesting data or merely waiting for and sensing it from, sufficiently nearby other apparatus that may report its location or otherwise provide identification data from which the newly placed apparatus can derive or create its own identifier. Data collection for self-identification, and especially passive collection, may beneficially comprise field strength measurement based on a known a priori profile of the link equation governing the wireless, RF, or visual data used for sensing. For example, the square-law falloff of radio frequency (RF) field strength can be used to infer self-geolocation by computing the sensed field strength of available apparatus the newly placed apparatus can receive or sense, and this may be adjusted for known, predicted, believed, specified, or expected effective radiated power level of each such sensed source to self-triangulate and determine current location. In a preferred embodiment, this method is implemented as apparatus in a computer program, such as in the C programming language recorded into and executing on an Atmel embedded processor provided within the newly placed apparatus, wherein the microprocessor ADC inputs are attached to sensors and provide the input data for field strength and other data from the neighbor nodes to the microprocessor's link equation computation predictive of distance vs. received signal strength. The nearby nodes also may beneficially compute the location of or distance to the new placed apparatus, and use this to identify it and compute its geolocation either as a centralized computation on a single processor or through a distributed algorithm for not requiring centralization of all data to associate identity with location for the newly placed apparatus.

In another embodiment, new apparatus may be associated with existing apparatus by bring it into sufficient proximity with the sensing apparatus of existing placed apparatus, such as by using wireless near-field communications (NFC) wireless communications or radio frequency identification (RFID) tags and sensors. Additional data comprising identifiers of each apparatus may be transmitted between them. In one embodiment, a cell phone or PDA apparatus equipped with NFC communications capability is brought near or into contact with an appliance such as a powered speaker comprising a loudspeaker, an amplifier, wired and/or wireless input and output connections for connecting to additional appliances or networks, and its own NFC apparatus. NFC communications between the phone or PDA and the powered speaker or other appliance associate them with each other, through transmission of identifying data. The powered speaker may beneficially comprise its own microprocessor especially programmed to receive NFC sensed data, record the identify of the connecting phone or PDA, associate it with additional communications means such as Bluetooth, Zigbee, WiFi, or other media for providing the speaker appliance with data from the phone or PDA, when the phone/PDA apparatus is brought into close proximity with or "tapped" on the appliance. In one embodiment, the appliance must be prepared to receive or permit NFC communications, such as through use of a button, switch, or other control signal or input that causes the appliance to enter into a state of readiness during which it accepts connections with control apparatus. Once associated, the phone or PDA may serve as a remote control and data provision apparatus that provides data to the appliance or directs it to obtain, accept or receive data from an alternative data source. In another embodiment, RFID or other proximity-based communications apparatus is used to permit association to occur. An associated controller/data source and appliance may retain in their storage a record of their past association. In a preferred embodiment, the controller/data source device most recently "tapped" on the appliance becomes the current control and/or data supplying device and governs its operation until a subsequent control apparatus is "tapped" on the appliance. This beneficially permits group sharing of a single appliance, such as for a group to listen to music on each of their phones or PDAs, or for a family to use their phone or PDA as a controller for a television or radio. This also provides an authentication method and apparatus for controlling the appliance and any data or computational resources to which it is connected, such that only accepted "tapped" devices are permitted to control or supply data to or obtain data from the appliance. For example, by controlling who or where "tapping" occurs, control of appliances or their data resources can be provided. In one embodiment, additional security data comprising encrypted communications, a password, entry of a PIN number, a text message to/from the phone/PDA, or an existing or separately-achieved network communications path are used or required to support authentication and authorization of access before a controller/data source apparatus may associate or become the current controller. This method and system also may be beneficially used to control and transmit authentication data such as are required to permit access under applicable rules, regulations, or law. For example to use radio equipment such as a radio transmitter, according to this invention a user may use an existing well-known portable medium such as a cell phone, credit card or bank-style smart card, or other information-bearing token for a non-financial purpose of authentication and authorization. In a preferred embodiment the token comprises a processor and storage. In a preferred embodiment the token's storage contains customization or personalization data. This may be beneficially used to provide "personality" to a device to transfer the user's identity, preferences, regulatory privileges, or a combination thereof from the token to the appliance. In a preferred embodiment, a processor such as a microprocessor in the appliance adapts the function, services, limitations, behavior, configuration, or any combination thereof to the "personality" so provided. In one embodiment, the token remains associated physically or via network with the appliance while it is in use of the token's owner-user. In another embodiment, the user reassociates their token with the appliance either periodically or upon completion of their use of the appliance. The token may store updated personalization and other usage-related data in its storage component for future use by the user with this or another appliance. In this way a pool of uncustomized appliances may be customized to each user, the user may retain their customizations for use with additional appliances in the future, and other users also may share use of the appliance. In a preferred embodiment the customization and personalization data are represented as first-class computational objects and may be securely transmitted either by the appliance, by the user's token, or both to archival backing stores, other computers, application software executing within the appliance or on the user's token or another computer, or any combination thereof, either at the time of use of the appliance or at a later date.

Digilog Display:

Digital displays comprising a raster image display are increasingly common for appliances, in part because they have become cheap to manufacture and can be controlled effectively by the microprocessor in an appliance. In recent years these have largely supplanted analog displays. The essential feature of an analog display is the representation of communicated information based on an visual or physical analogy between the expressed information and some sensible characteristic of the display. For example, a digital display an FM radio station tuned to "88.5 FM" may literally display the alphanumeric characters "88.5 FM" using LED, LCD, organic LED, or other raster-based means, or through a low-resolution equivalent such as a 7-segment or "British flag" segment-based digital display. Conversely, an analog display of a radio frequency may comprise a linear scale along which a needle is moved a distance from left to right in correspondence with the tuned frequency as a percentage of the total band represented by the dial. Thus a radio tuned to 88.5 FM would have a long linear display with its indicator needle near the leftmost edge of the dial, communicating that 88.5 FM is at the lowest end of the 88 MHz to 108 MHz broadcast band. The position of the needle along the display is an analogy to the location of the station within the broadcast band.

Digital displays are effective at display of alphanumeric or graphical data but ineffective at providing the intuitive understanding afforded by an analog display. In a moment's glance an analog display tuned to 88.5 MHz communicates "bottom of the broadcast band" and is memorable through association with what the user conceives of as a place, whereas the number 88.5 is no more memorable than any other set of digits and does not communicate its data memorably through spatial intuition.

There thus is a need for a display that advantageously can be interfaced with and accept data from a digital source such as a microprocessor, but can communicate using spatial or other analogy.

The Digilog display invention of this disclosure combines the benefits of digital and analog displays. In one embodiment, digital data from a microprocessor or comparable digital data source are mapped to a spatial representation to simulate an analog display. For example, the FM broadcast band comprises no more than 100 stations as a matter of regulatory limitation, so 100 vertical positions are sufficient to represent all possible stations. In one embodiment, 100 LEDs are arranged below a row of 100 light-transmissive plastic light pipes and the nth LED is lit when the tuned frequency is n percent of the total band.

In another embodiment, greater display density may be achieved, such as to make the display physically more compact, by arranging the LEDs and/or light pipes three-dimensionally to alternate back and forth in depth from the display slightly such as in an overlapping manner. In another embodiment, fewer light pipes and/or LEDs are used and a display averaging technique is used to light them. The display averaging technique may be computed by a microprocessor programmed to control the display, and may comprise lighting several adjacent LEDs, lighting the center-frequency LED more brightly than the adjacent LEDs, modulating the brightness to achieve an constant average visible light level for the viewer, and/or modulating the light level to achieve the perception of a single constant needle width. In another embodiment, the width of the display area lit beneficially corresponds to a second communications-related aspect of the radio's operation such as the filter bandwidth, modulation scheme, signal strength, time since a signal was received on that frequency, or other communications factor, or any combination thereof. In one embodiment, combinations may include the mathematical product of the two communication aspects, such as of recency and strength of a received signal.

As further detail of the Digilog display method and apparatus, in one exemplary embodiment, using 3 mm (approx. ⅛") LEDs spaced 3 mm apart in an LED bar, to allow for physical support and corresponding optical components, permits display of 16 discrete tuning values for frequency in a 4 inch dial display, or 32 in an 8 inch dial. A single tuning potentiometer, whether discrete-component or integrated circuit, can selectively light a successive LED, such as using an LED driver chip. If the LEDs are sufficiently close, the user then perceives sufficiently small jumps from one LED to the next to approximate a "smooth" tuning display. In one embodiment, this is enhanced further by staggering the LEDs, such as by honeycomb packing them into two rows to achieve closer spacing. To the extent there is variation of luminance viewed in the perpendicular plane, this variance then can be adapted for in the optics and the controlling microprocessor, which can vary light by varying the current provided to each LED.

If the LED bar is oriented vertically at the base of a tuning dial assembly, with a light conduit such as a bar of clear light-conductive plastic above it, and this is placed behind a bezel, then tuning the potentiometer lights successive LEDs and the user perceives a bar of light corresponding to a tuning needle moving across the spectrum in analogy to the percentage of the advancement of a potentiometer or digital encoder through the radio's tunable spectrum.

The bezel in front of the LED optics may be translucent rather than transparent and chosen to provide some light diffusion. The nominally Gaussian blurring of the LED light emitted through the bezel further enhances the user's perception of a single needle moving smoothly through along the tunable spectrum.

The bezel and LEDs may be chosen for their color. In one preferred embodiment color is provided for, wherein for example a translucent "green edge" acrylic bezel diffuses the light and provides a green tint to the LED light. Other plastics, glass, or other transparent or translucent materials may be used for the bezel and other viewing components of the display assembly. The LEDs may be chosen for a compatible or contrasting color. They also may be chosen to alternate color to enhance the user perception of tuning progress as successive LEDs are lit.

More than one tuning LED may be lit. The brightness of a single LED or a plurality of LEDs may be chosen to differ to achieve effects meaningful to the user. For example, in a preferred embodiment, the current provided to one or more LEDs may be pulse-width modulated (PWM), altering their power supply duty cycle to achieve an effect that looks to the user like dimming the LED, that is, changing its quantity of emitted light or its brightness. In a preferred embodiment, PWM of the LEDs' power supply is provided in a specially programmed microprocessor controlling the display. Multicolor LEDs may be used to color-encode and visually indicate any single communications aspect or plurality of communications aspects. LED color also provides for user customization. For example, in a preferred embodiment a multicolor Red-Green-Blue (RGB) LED is provided, rather than or in addition to a monochrome LED. The user selects the color they prefer for the tuning dial, and their color choice is manifested by the tuning display electronics by selectively enabling the red, green, and/or blue LED components within the single multi-color LED carrier. In another embodiment, the LEDs may be selected to alternately switch to successive colors as the radio is tuned or in accordance with other variables known inside the appliance electronics, such as volume, temperature, bass/treble equalization, demodulation mode, selected band, enablement or disablement status of a feature, confirmation or disconfirmation of a user choice, power on/standby/off, filter choices, and other state attributes of the appliance. Altering color of displayed LEDs also may be used to achieve cognitive and artistic effects such as a rainbow effect as the dial is tuned, or to communicate a dynamic variable such as the tuning rate instantaneously in effect when the potentiometer or encoder is tuned more quickly or slowly.

Lighting multiple LEDs also may be used to achieve enhanced frequency precision. This may be combined with brightness control using PWM of the power supply to all LEDs or each LED. For example, in a preferred embodiment, a mathematical function such as a Gaussian or a Mexican Hat Wavelet is applied to the LED power supply feed driving a collection of successive adjacent LEDs so that the center LED among the driven LEDs is brightest. The mathematical function may be chosen to achieve a perceived visual property such as sharpness of tuning selection, blur of tuning precision, width or narrowness of the tuned segment, and other well-known radio/appliance and cognitive properties. The Gaussian or other mathematical function may be computed dynamically at the time of the appliance display use or it may be precomputed earlier than display time, such as at design time. Mathematical distribution functions such as Gaussian, Bessel functions and their mathematical properties and the techniques for computing them are well-studied and well-known, and the entire range of such mathematical functions may be provided using the Digilog display. Electronics for computing these mathematical functions or for storing them for later use may comprise microcontroller units (MCUs), lookup tables, nonvolatile random access memories, and any other electronics storage and computing devices and methods.

In a preferred embodiment, discrete forms of the continuous mathematical function to be applied may be precomputed and stored for later use, or may be efficiently computed when needed. For example, a discrete substitute for the continuous Gaussian function is conveniently computed or precomputed using the discrete Gaussian kernel based on modified Bessel functions of integer order. This method offers the advantages of effective digital implementation, avoiding mathematical errors known in the art to be possible when sampling the continuous function, and achieving greater accuracy. In other embodiments the continuous form of the mathematical function may be preferred, either in extensional or intensional form.

Alternative mathematical functions may be selected by either the designer or the user and applied either in advance at design time or dynamically during product use. Example such functions are well-known in digital signal processing and related applied mathematical disciplines and include, for example, Chebyshev, Butterworth, Bessel, elliptical, and Legendre functions.

In a preferred embodiment, the total light output of the display is computed to be a constant perceived brightness value, and the power supply feed to individual LEDs is modulated to satisfy this constraint. Thus if multiple LEDs are lit, they may each produce less light than if only one LED is lit. Controlling total emitted light offers benefits including power consumption management when operating from batteries, avoiding distracting variations in radio front panel display as a radio is tuned or otherwise configured by a user, permitting reduction of total light output in response to ambient inputs such as background light or sound, and permitting users to dim or brighten a display for personal preference or to suit operating conditions.

In a preferred embodiment, the amount of light emitted may be kept constant by computing or estimating the function representing the relationship between the power signal to the LEDs instantaneously integrated across all powered LEDs and the output measured in lumens or a comparable optical metric. An inverse of this function then may be computed or estimated to determine the control inputs, such as voltage, current, and PWM duty cycle, to the power source for the LEDs. These functions may be computed dynamically at design time. Alternatively, in a preferred embodiment, they may be precomputed and stored as a look-up table or equivalently implemented in direct digital hardware using appropriately chosen electronic components to achieve the desired psychophysical effect such as constant total perceived display brightness. It will be understood by one of skill in the art that perceptual metrics other than constant brightness may be implemented using this invention, such as constant color, change of color or brightness at a specified rate over time, glowing or pulsating effects, time-diminishing trail effects, and similar control variations.

Control of display output also may be integrated with security features of the apparatus. In one preferred embodiment, aspects of the displayed information are not presented until a user has authenticated themselves and been authorized to use or control the apparatus. In a preferred embodiment, the user must present an authorization token to the system. The token may comprise a identifier-bearing physical apparatus comprising NFC, credit card, RFID, barcode, or other identifier and may also comprise a microprocessor, storage, and/or encrypting/decrypting electronics, or a combination thereof.

In an alternative embodiment, the analog display is simulated using a raster digital display, with the tuning dial represented graphically on the visual display and a tuning needle or indicator also appearing on the display. The displayed region may be expanded or contracted as if zooming in our out on the tuning dial.

The use in this disclosure of a particular base analogy, such as frequency tuning vs. display width as an embodiment analogy, is exemplary in this disclosure and not limiting. Other variables may be mapped to the analogy of the Digilog display, such as standing wave ratio (SWR), voltage or current, impedance, inductance or capacitance, distance, loudness, harmonic distortion storage capacity, computer processor utilization, filter bandwidths, user-customizable settings and configurations, and similar data variables. Both measured and user-set variables may be displayed. Further, different data may be overlapped or combined to permit more than one source or form of data to appear on a single display, and multiple displays may be provided or conjoined to operate either independently or in concert. The display need not use or be limited to visible light, and in one embodiment uses acoustic properties such as a particularly chosen pitch or loudness instead of a particularly chosen pattern light located on a graphical display as the underlying analogy. The disclosed mapping of digital data to the analogy is intended as to all such analog-range or analog-interval media and apparatus. Combinations also are intended as to such media, such as of analog acoustic and analog visual apparatus.

In another embodiment, the readability or legibility of a display is enhanced by a method and apparatus comprising computing the inverse optical function of the viewer's eyesight such as their eyeglasses prescription, such as through computation of the convolution kernel that embodies the optical inverse mathematical function of the user's eyeglasses prescription. A suitably specially programmed microprocessor controls a display apparatus and comprises either a program computing the convolution mathematics to compute the inverse optical function, or contains a stored or prestored lookup table computing the required optical function, or provides them both in combination. The convolution kernel then is applied by the microprocessor to the data to be displayed on or at the display surface in order to invert the viewer's optical pathology thereby providing displayed pictures and text that are legible to the individual even without their eyeglasses or other eyesight correction apparatus. This method and apparatus expressly provides for adapting entire display surfaces, projected surfaces, display walls, and computer monitors and entertainment displays to permit users to view and use them without eyesight correction. For example, a display wall on a shower providing this invention permits someone who is unable to wear their eyeglasses or contact lenses in the shower to see, read, and interact with the wall as a display and control surface. This invention also may be beneficially used to demonstrate how the world appears for an individual with a particular optical pathology, such as for teaching purposes, during medical visits for eyesight correction and corrective vision prescription, for comparison of alternative optical pathologies, for legal purposes such as demonstration at trial, and in optical and medical test equipment. In an alternative embodiment, the optical correction of this method and apparatus is provided differently to a plurality of individuals viewing the same display surface or visible information. In one exemplary embodiment, the optical correction is computed and added to "3D" movie eyeglasses the user wears to view 3D content, such as in a home or theater 3D entertainment system, obviating the need for a viewer with eyesight pathology to wear two pairs of eyeglasses simultaneously. In another embodiment, the light transmitted from the viewing surface is differentially directed to different viewers according to their eyesight pathology, for example by projecting light on a crystalline or other three-dimensional reflective surface or passing it through a microlens layer on the surface of a display monitor in order to direct light differently to different viewers. In an exemplary embodiment, a microprocessor then determines the proper correction computation for each individual viewer or group of viewers and applies the required optical inversion function as described above to provide each viewer with their needed correction and a view of the common display surface adapted to each individual's optical requirements.

In one embodiment, all displays are bright & visible in daylight. In another embodiment, the display is auto-dimmed in a darker environment, comprising sensing the ambient light level using an LDR or equivalent sensor and a microprocessor within or outside the appliance modulating the current to the display device, sending it a control signal to dim, or a combination thereof. In a preferred embodiment, a backlight is provided for one or a plurality of the buttons, keys, knobs, and other controls associated with the display, which are modulated in light level in association with the display. In one embodiment, the display may be zoomed in scale so smaller-font content can be made larger momentarily when needed, e.g. by tapping. In one embodiment, alerts cause a temperature-color change, blinking or glowing (such as up/down brightness 0.5 Hz) to attract user attention. In one embodiment, configurable audio alerts for events are definable or settable by the user in association with states within the appliance and modulation of its display. Events within the appliance comprise, in the example of a communications radio, radio events such as sudden change in SWR, SWR above threshold with color-coding indicating degree of danger, exceeding power output limit rule for license class according to regulations or applicable rules such as during a contest, and external events such as a desired contact appearing down the band on the radio or being announced via other media such as on Internet (such as using "DXSummit" and other known public data-sharing resources). In another embodiment, these features are associated with multiple forms of Internet connection including tethering.

Displays in appliances providing communications data output have limited and flawed representation. For example, when viewing the radio spectrum on a communications radio receiver to see multiple simultaneous received signals in a sufficiently wideband receiver, receiver appliances commonly use a "waterfall" display to show simultaneously the dynamic reception of frequency, received signal strength, and time variables, invariably organized as a sequence of pixels appearing to flow downward on a raster display. This display technique has been known for at least 40 years and was used in sonar systems. In some cases receiver appliances adapted to translate a received data signal such as Morse code or phase-shift keying (PSK) will also present a separate display window wherein the received text is displayed in "reading order," that is, left-to-right and top-to-bottom within the window for English and most Western languages. In such appliances the user must select one of many simultaneously active received signals to have it be assigned the display window. Although more than one text display window can in principle be provided, the text display windows use up valuable screen real estate and present conflicting demands for scrolling space. These displays are commonly built into expensive receiver appliances and also are available in software, and all known instances follow this design principle without material variations even after decades of frustrating market experience with the insufficiency of these display products.

In the present invention, the receiver appliance display direction and data flow is rotated 90 degrees from its conventional "waterfall" display configuration, so that the signal display flows sideways rather than top to bottom. In a preferred embodiment, the display flows in "ticker-tape direction," that is, from right to left for English and most Western languages. The text corresponding to each received signal selectably may appear superimposed over the raster image of signal to which it corresponds, or suitably and adjustably nearby. As many simultaneous text stream may be displayed as signals can be received. In one embodiment the text is adjustably placed just above or below its corresponding raster flow. In one embodiment both the text and the display may be controlled by the user including expanding and contracting, such as with knobs or through touch-based pinch gestures applied to the display surface. In one embodiment the text flow may be dragged or otherwise repositioned to a different display area, such as to either a running ticker-tape region or a separate text window.

In one embodiment the user may select a different natural language for any text stream, and a computer processor specially programmed to perform text translations then will translate the text into a different language. For example, a signal stream received in French initially would appear as the French words transmitted by the sender, but either at the user's command or automatically once detected as French according to either a default configuration or one selected by the user, the French data may be translated to English, or German, or any other language, and the text flow on the display then will continue in the newly selected language. In one embodiment, the specially-programmed processor comprises a microprocessor within the appliance. In another embodiment, the appliance communicates the data corresponding to one or a plurality of received streams to a remote computer processor specially programmed to perform the language translation, receives back the translated text, and presents the translation on the display. In another embodiment, received encoded digital signals such as Morse code, radioteletype (RTTY), FSK, or TOR may be translated to any language including the native language of the appliance user. In one embodiment, additional data such as communications prosigns also may selectably be translated to the native language. In an alternative embodiment, they may be left for display as communications prosigns. In still another embodiment, a lexicon of prosigns, abbreviations and other codes may be compatibly applied to the text stream before or after translation, to translate common or user-specific expressions to common speech or other forms. For example, a Morse code operator transmits "HIHI" to indicate laughter, and this may be translated on display to an alternative notation such as "(laughter)" that is more easily understood by a non-expert in Morse code, or even to the abbreviated colloquialism "LOL" to suit an audience who understands this alternative abbreviation to indicate laughter. In one embodiment, the translation comprises a stored table that may be configurable by the user of the appliance, such as by loading or editing a correspondence list that then is used computably to perform text substitutions by the microprocessor before display.

It will be understood that this invention applies to any data so received by an appliance, not limited to a radio receiver or signals received using radio frequency transmission. For example, a test equipment or display appliance that receives data from a remote oscilloscope providing its data annotated in French equally can translate those data to the native or preferred language of the receiving user or their appliance for either display or further processing. Similarly, non-text-format received data may be processed to extract text data for direct display or display after translation, for example by processing received graphical data through an optical character recognition (OCR) program.

The resulting data may be provided to the user through media and means other than raster-image display, instead of or simultaneous with the visual data display in the original or translated language or both. In one embodiment, a text-to-speech (TTS) algorithm is programmed operably into the microprocessor of the receiver appliance, the translated text stream is supplied to the TTS program, the TTS program translates the text to the corresponding set of data values or electronic signals embodying the corresponding acoustic speech in the target language, and the acoustic speech output is provided to the user's loudspeaker or headphones. In another embodiment the verbal speech received by the radio receiver is provided to a speech translation program that accepts sound as input and translates acoustic speech in one language to acoustic speech in a second language. In this way, for example, a non-Russian-speaking English speaker listening to a text or spoken international broadcast or transmission can hear its English translation live. It is understood that "radio receiver" here is meant to encompass all forms of receiving data such as, without limitation, by shortwave broadcast, in a two-way radiocommunication, by telephone, via the Internet, by email, by SMS or MMS text message, by textual or multimedia instant messaging, or by any other media or manner of providing the data source. In another embodiment, the translated data are further provided by the appliance to additional data sinks, that is, to additional displays, to remote data feeds, to broadcast stations for retransmission or rebroadcast in the translated language, to Internet streaming sites and services, to local Intranets, to conference room displays, to telephone call participants, to computer or storage devices for archival or later use, to a robot or android's speech output apparatus, to an email message to be subsequently transmitted, to a movie screen, to the user's or others' personal digital assistant (PDA) or cell phone or tablet appliances, to news services or publishing services of any kind, to intercom or other interpersonal and distributed communications systems, or to local or remote computers comprising additional programs for further processing.

Entertainment and Test Equipment Appliances as IoT Apparatus:

Existing appliances used for arts and entertainment include metronomes, electrical and electronic musical instruments, teaching systems for music instructions, and studio recording and measurement equipment. Such systems may be beneficially interfaced to a network, such as to report locally visible meter results to a remote or networked location, computer, or second appliance.

In one exemplary embodiment, a VU meter is adapted with an IoT interface such as a network or bus interface comprising electronics, microprocessor, and specially-adapted microprocessor software or firmware for networking or bus operations providing data packetizing or serialization, synchronization or medium availability and state sensing, and transmission/reception through wired or wireless physical communications electronics and corresponding physical (PHY) communications layer media such as wires or optical or radio transmission. The data sensed by the measurement meter and reported on its local display, such as sound level in deciBels (dB), are also encoded suitably for the IoT interface and communicated with other appliances or computers. The meter also may be controlled over the IoT interface remotely such as to request data, to select from among alternative input data sources, to self-identify, to change its sensitivity or other operating parameters, or to select from among alternative display modes or measurements programmed into its specially-programmed microprocessor controlling the VU meter. Other meters and sensor and display devices may be used beneficially with the invention of this disclosure in addition to or instead of a VU meter.

In another exemplary embodiment, an electronic metronome may be adapted with an IoT interface and a microprocessor comprising specially-programmed software or firmware. In one embodiment, the metronome sends its audio signal to a remote acoustic playback apparatus such as an amplifier and speakers. In a second embodiment, the metronome or apparatus connected to it through its IoT interface may communicate musical data, such as an MP3, WAV, or similar digital format or analog electronic acoustic sound signals, to be played on a speaker within the metronome alone or in combination with the metronome's timekeeping tones or clicks. This affords an ability for a musician to play simultaneously with "music minus one" recording, that is, a practice recording comprising the sounds of all instruments except the instrument the musician is playing. In a third embodiment, the metronome is adapted to comprise a microphone, and the microprocessor in the metronome is specially programmed to accept input from the microphone, and compare it to either or both of music stored in the metronome or the metronome's timekeeping signal. The metronome then tracks, records, synchronizes, assesses, reports, and/or offers correction to the musician. In another embodiment, the metronome contains a clock function for keeping track of practice time, alerting the user after passage of time overall or for time spent practicing an individual piece of music, informing a music teacher of the end time of a lesson, or controlling the use of a shared resource such as a practice piano at a collegiate music department. In another embodiment, the metronome is adapted to comprise a local interface for listening, such as an audio headset jack, a Bluetooth or WiFi or other wireless interface, or other means of providing output. In a preferred embodiment, a computer processor within the metronome may have executable software as well as data loaded into it through its IoT interface to augment its functionality, permit customization, and provide for upgrades.

In another exemplary embodiment, a microphone appliance comprises an acoustic transducer input device and additional electronics apparatus. One problem with conventional microphones is the uncertainty of the user as to whether microphones are on, plugged in, or working. Another problem is the fixed frequency response profile of conventional microphones due to electronics and physical resonance characteristics, causing the microphone to be appropriate for some user but not others, such as for people with high but not low-pitched voices or vice versa. In this invention, in one embodiment a microphone appliance comprises a microprocessor and especially-programmed software to adapt the microphone appliance to adapt or be configurable such as through equalization to each user's voice profile. In another embodiment, the microphone comprises an indicator the behavior of which changes in accordance with the acoustic input profile as the user speaks or sings, or other sound is received by the transducer. In one embodiment, an LED or other visual display indicator is pulse-width modulated in relation to the volume of acoustic signal received by the microphone transducer, thereby indicating that the microphone appliance is turned on and functioning and modulating properly. In one embodiment, the motor of a ribbon microphone appliance is manufactured additively or subtractively as a single block of nonconductive carrier material such as plastic comprising slots or channels into which one or plural magnets and one or plural ribbons may be set or pressure-fit without requiring additional mounting hardware or assembly of a plurality of carrier components. In a preferred embodiment the "personality" of the user may be associated with and provided to the microphone appliance to configure it to the token owner's personal appliance profile, such as by "tapping" the microphone appliance with an NFC-enabled identity token, wireless or proximity association of a token, or insertion of an identify token into the appliance locally or remotely via a network connection.

Multimodal IoT Sensing:

Internet-of-Things apparatus are expected to comprise small apparatus, large numbers of apparatus, large numbers of sensors, physically dispersed sensors and effectors, and communications among and between them. Small portable, dispersed, and/or field-deployed devices typically have a limited energy budget making frequent extensive long-distance communications undesirable. Physical location is challenging because it often is poorly known by IoT apparatus kept intentionally simple for reasons including power budget. Also, many sensors have limited utility without precise location or distance knowledge. For example, a radio frequency (RF) field strength meter that is not calibrated for absolute location or known distance from the transmitter it is measuring with known RF link equation parameters can only be used to measure relative, not absolute, field strength by virtue of its lack of geolocation calibration. Modern electronics and micro mechanical devices now permit and enable development of inventions to solve these problems. In this invention, an IoT appliance is adapted to comprise a relative or absolute geolocation sensor data source. In one embodiment, an RF field strength meter is adapted to comprise an accelerometer, a computer processor such as a microprocessor configured to accept the accelerometer data as a data input source, software that can be configured with a starting time or location and that reads the accelerometer data and continuously determines relative or absolute location, and a display, storage, or communications interface for displaying, storing, or communicating the computed field strength adjusted for geolocation. In a second embodiment, the apparatus is adapted to comprise a GPS receiver that provides the relative or absolute geolocation data to the processor and its software. This beneficially provides for an RF field strength reading that varies as the user walks or otherwise moves through the electromagnetic field. In another embodiment, the software on the provided computer or executing on another computer with which it communicates further computes a one-dimensional or multidimensional mapping of the source. This may be used for terrain mapping, antenna pattern determination, antenna design and gain measurement, predictive calculation or inference of transmission effectiveness or minimal required power according to a link equation governing the transmissions and apparatus, and auto-tuning of the transmitter and its antenna system either locally or remotely.

Test Equipment Appliances:

Modern test equipment suffers from a "Tower of Babel" problem wherein each piece of test equipment is separately designed and the different test equipment appliances do not share information according to a common standard format that is secure, representative of both the data and the domain-level knowledge and reasoning that are to be performed about it, platform and vendor independent, archivable, network-compatible, and capable of easy customization. According to the present invention, test equipment comprises an especially-programmed microprocessor with an external communications interface and software or firmware that provides a standard communications format and language a protocol modeling domain-level knowledge as well as sensor data. In one embodiment, security is provided through encryption of the data transmitted to and from the test equipment sensor device and other communications-attached appliances and computers. In one embodiment, at least one appliance in a network comprising test equipment and sensors comprises a download method to adapt the appliance to receive computations to perform as well as data. In one embodiment, at least one appliance in a network comprising test equipment and sensors comprises a download method to adapt the appliance to execute general-purpose programs. In a preferred embodiment, downloaded programs and/or data comprise first-class computable objects according to a virtual machine model comprising first-class continuations as disclosed herein. In one embodiment, the test equipment and sensors may be sent control and data information through their communications medium to change their operating behavior, profile, user customizations, sensitivity, reporting rate, reporting format, reporting targets, or a combination thereof. In one embodiment, the test equipment appliance communications is wireless. In another embodiment, the test equipment appliance communications comprises wired media. In another embodiment, the test equipment appliance communications comprises use of Internet protocols, such as without limitation those published by the Internet Engineering Task Force (IETF) and the TCP/IP protocol suite.

Combination of all these methods and apparatus also are intended and hereby disclosed.

Operating Environment: The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method of selecting a signal to be sent to a plurality of electronic components having a varying performance profile, at least one of said plurality of electronic components being in each of a plurality of electronic appliances, said plurality of electronic components having a range of unmeasured manufacturing variation of at least one performance variable, the method comprising:
   selecting said signal to span the range of unmeasured manufacturing variation of said at least one performance variable;
   sending said signal to at least one of said plurality of electronic components; and
   varying said signal over the range of unmeasured manufacturing variation of said at least one performance variable, said range representing a range of unmeasured manufacturing variation of said at least one of said plurality of electronic components, wherein said range is an expected range of variation of the varying performance profile of said at least one of said plurality of electronic components, said varying of said signal spanning said range of unmeasured manufacturing variation of said at least one of said plurality of electronic components, so as to create a uniform experience across said plurality of electronic appliances.

2. The method of claim 1, wherein said at least one of said plurality of electronic components is an appliance effector component.

3. The method of claim 1, where said at least one of said plurality of electronic components is a manufactured device having a specified performance profile, said specified performance profile having said range of unmeasured manufacturing variation rather than a unique point value.

4. The method of claim 1, wherein said at least one performance variable is a resonant frequency of said at least one of said plurality of electronic components.

5. The method of claim 4, wherein said frequency is a known frequency of said at least one of said plurality of electronic components.

6. The method of claim 4, wherein said frequency is an expected frequency of said at least one of said plurality of electronic components.

7. The method of claim 1, wherein said performance range is a voltage-dependent performance range of said at least one of said plurality of electronic components.

8. The method of claim 1, wherein said performance range is a current-dependent performance range of said at least one of said plurality of electronic components.

9. The method of claim 1, wherein said performance range is a frequency-dependent performance range of said at least one of said plurality of electronic components.

10. The method of claim 1, wherein said at least one of said plurality of electronic components is an electronic acoustic annunciator.

11. The method of claim 4, wherein a frequency of said varying control or stimulus signal sent to said at least one of said plurality of electronic components is a frequency range selected to span a plurality of frequencies from above to below said resonant frequency of said at least one of said plurality of electronic components.

12. The method of claim 4, wherein said signal is varied below and above said resonant frequency of said at least one of said plurality of electronic components.

13. The method of claim 1, wherein said range is a design range of variation of a performance profile of said at least one of said plurality of electronic components.

14. The method of claim 1, wherein said signal comprises a control or stimulus variable provided to said at least one of said plurality of electronic components selected to span an expected or design range of variation of said at least one of said plurality of electronic components.

15. The method of claim 1, wherein said signal comprises a plurality of control or stimulus variables provided to said at least one of said plurality of electronic components, wherein each of the plurality of said control or stimulus variables is selected to span an expected or design range of variation of said at least one of said plurality of electronic components.

16. A system to select a signal to be sent to a plurality of electronic components having a varying performance profile, at least one of said plurality of electronic components being in each of a plurality of electronic appliances, said plurality of electronic components having a range of unmeasured manufacturing variation of at least one performance variable, the system comprising a microprocessor and memory, the memory storing instructions, which, when performed by said processor, perform the following:
- selecting said signal to cross the range of unmeasured manufacturing variation of said at least one performance variable;
- sending said signal to at least one of said plurality of electronic components; and
- varying said signal over the range of unmeasured manufacturing variation of said at least one performance variable, said range representing a range of unmeasured manufacturing variation of said at least one of said plurality of electronic components, wherein said range is an expected range of variation of the varying performance profile of said at least one of said plurality of electronic components said varying of said signal spanning said range of unmeasured manufacturing variation of said at least one of said plurality of electronic components, so as to create a uniform experience across said plurality of electronic appliances.

17. The system of claim 16, wherein said at least one of said plurality of electronic components is an appliance effector component.

18. The system of claim 16, where each of said plurality of electronic components is a manufactured device having a specified performance profile of each of said plurality of electronic components, said specified performance profile having said range of unmeasured manufacturing variation rather than a unique point value.

19. The system of claim 16, wherein said manufacturing performance variable is a frequency of each of said plurality of electronic components.

20. The system of claim 19, wherein said frequency is a known frequency of each of said plurality of electronic components.

21. The system of claim 19, wherein said frequency is an expected frequency of each of said plurality of electronic components.

22. The system of claim 16, wherein said unmeasured manufacturing performance range is a voltage-dependent performance range of each of said plurality of electronic components.

23. The system of claim 16, wherein said unmeasured manufacturing performance range is a current-dependent performance range of each of said plurality of electronic components.

24. The system of claim 16, wherein said unmeasured manufacturing performance range is a frequency-dependent performance range of each of said plurality of electronic components.

25. The system of claim 16, wherein each of said plurality of electronic components is an electronic acoustic annunciator.

26. The system of claim 19, wherein a frequency of said varying control or stimulus signal sent to said at least one of said plurality of electronic components is a frequency range selected to span a plurality of frequencies from above to below said frequency of said at least one of said plurality of electronic components.

27. The system of claim 19, wherein said signal is varied below and above said frequency of said at least one of said plurality of electronic components.

28. The system of claim 16, wherein said range is a design range of variation of a performance profile of said at least one of said plurality of electronic components.

29. The system of claim 16, wherein said signal comprises a control or stimulus variable provided to said at least one of said plurality of electronic components selected to span an expected or design range of variation of said at least one of said plurality of electronic components.

30. The system of claim 16, wherein said signal comprises a plurality of control or stimulus variables provided to said at least one of said plurality of electronic components, wherein each of the plurality of said control or stimulus variables is selected to span an expected or design range of variation of each of said at least one plurality of electronic components.

* * * * *